JOHN P. ZELLER.
Improvement in Cups for Grain-Drills, &c.
No. 114,384. Fig. 1. Patented May 2, 1871.
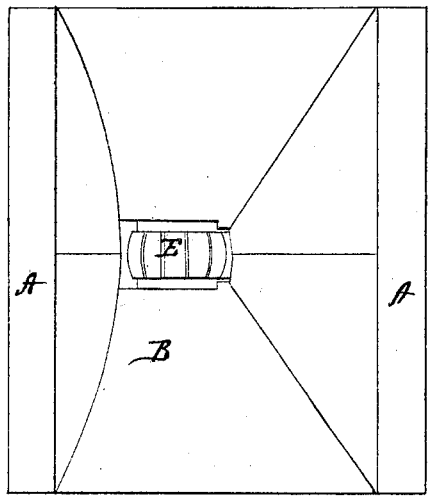
Fig. 2.
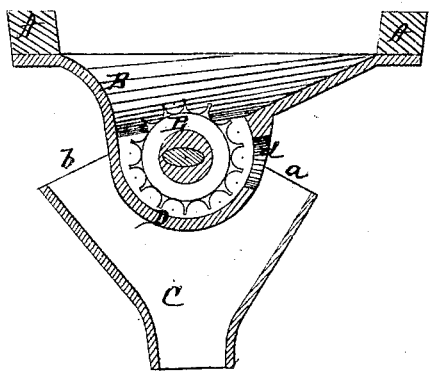
Witnesses
Inventor
John P. Zeller
per
Alexander Mason
Attys.

United States Patent Office.

JOHN P. ZELLER, OF SOUTH BEND, INDIANA.

Letters Patent No. 114,384, dated May 2, 1871; antedated April 18, 1871.

IMPROVEMENT IN CUPS FOR GRAIN-DRILLS, &c.

The Schedule referred to in these Letters Patent and making part of the same.

To all whom it may concern:

Be it known that I, JOHN P. ZELLER, of South Bend, in the county of St. Joseph and in the State of Indiana, have invented certain new and useful Improvements in Cups for Grain-Drills and Broadcast-Sower; and do hereby declare that the following is a full, clear, and exact description thereof, reference being had to the accompanying drawing and to the letters of reference marked thereon making a part of this specification.

The nature of my invention consists in the construction of a bottom and cup in grain-drills or broadcast-sowers with two or more receiving-holes for grain and fertilizer, or both, as will be hereinafter fully set forth.

In order to enable others skilled in the art to which my invention appertains to make and use the same, I will now proceed to describe its construction and operation, referring to the annexed drawing, in which—

Figure 1 is a plan view, and

Figure 2 is a transverse vertical section of my improved grain-drill bottom and cup.

A A represent the sides of the hopper, in which the grain is placed for sowing.

B is the bottom thereof, provided with an opening for the passage of the grain.

Under the bottom is formed a cup, C, with two receiving-holes or openings, $a$ and $b$.

Within the cup C is formed a circular flange, D, having an opening, $d$, through which the grain is passed by the wheel E within the same, so as to fall down through the hole or opening $a$.

On the front side of the hopper A is to be secured a fertilizer-box or hopper, so as to let the fertilizer fall down through the opening $b$, the grain and fertilizer then coming together within the cup and passing through a flexible pipe into the boot and into the ground.

The bottom B with cup C and flange D are cast in two pieces, through the center, and fastened together on the hopper.

Having thus fully described my invention,

What I claim as new, and desire to secure by Letters Patent, is—

The within-described cup for grain-drills, made of metal, with the inclined hopper-bottom B, curved flange D, inclosing the wheel E between it and the hopper-bottom, and the hanger-cup C, all as shown and described.

In testimony that I claim the foregoing I have hereunto set my hand this 4th day of June, 1870.

JOHN P. ZELLER.

Witnesses:
GEORGE PFLEGER, Jr.,
WILLIAM G. GEORGE.